(12) United States Patent
Yoshida et al.

(10) Patent No.: US 7,767,344 B2
(45) Date of Patent: Aug. 3, 2010

(54) LITHIUM SECONDARY BATTERY

(75) Inventors: Toshikazu Yoshida, Tokushima (JP); Maruo Kamino, Tokushima (JP)

(73) Assignee: SANYO Electric Co., Ltd., Osaka (JP)

( * ) Notice: Subject to any disclaimer, the term of this patent is extended or adjusted under 35 U.S.C. 154(b) by 1448 days.

(21) Appl. No.: 11/091,942

(22) Filed: Mar. 29, 2005

(65) Prior Publication Data

US 2005/0221189 A1 Oct. 6, 2005

(30) Foreign Application Priority Data

Mar. 30, 2004 (JP) ............................. 2004-100359

(51) Int. Cl.
*H01M 4/40* (2006.01)
*H01M 4/70* (2006.01)
*H01M 4/58* (2006.01)

(52) U.S. Cl. ............... 429/231.95; 429/233; 429/231.9; 429/231.1

(58) Field of Classification Search ........................ None
See application file for complete search history.

(56) References Cited

FOREIGN PATENT DOCUMENTS

| EP | 1231653 A1 * | 8/2002 |
|----|----|----|
| JP | 10-255768 | 9/1998 |
| JP | 11-195421 | 7/1999 |
| JP | 11-273683 | 10/1999 |
| JP | 2000-058127 | 2/2000 |
| JP | 2002-083594 A | 3/2002 |
| JP | 2002-157996 | 5/2002 |
| JP | 2002-289198 | 10/2002 |
| JP | 2003-7305 | 1/2003 |
| JP | 2003-007305 | 1/2003 |
| JP | 2003-051340 | 2/2003 |
| WO | 01/31722 | 10/2000 |
| WO | 01/31723 | 10/2000 |

* cited by examiner

*Primary Examiner*—Dah-Wei Yuan
*Assistant Examiner*—Angela J. Martin
(74) *Attorney, Agent, or Firm*—Kubovcik & Kubovcik

(57) ABSTRACT

A lithium secondary battery includes a negative electrode, a positive electrode, and a non-aqueous electrolyte. The negative electrode includes a negative electrode current collector (3b) having an irregular surface and a negative electrode active material layer (3a) formed on the surface. In the lithium secondary battery, the negative electrode active material layer (3a) is composed of a material that alloys with Li; thickness of the negative electrode active material layer (3a) (μm)/10-point mean surface roughness Rz of the negative electrode current collector (3b) (μm) is in the range of from 0.5 to 4; and tensile strength of the negative electrode current collector (3b) (N/mm²) at 25° C.×the negative electrode current collector base thickness (mm)/thickness of the negative electrode active material layer (3a) (μm) on one side of current collector is 2 or greater.

20 Claims, 3 Drawing Sheets

LITHIUM SECONDARY BATTERY

BACKGROUND OF THE INVENTION

1. Field of the Invention

The present invention relates to a lithium secondary battery comprising a positive electrode, a non-aqueous electrolyte, and a negative electrode which is an alloy negative electrode and includes a negative electrode current collector having an irregular surface and a negative electrode active material layer formed on the irregular surface.

2. Description of Related Art

A lithium secondary battery that uses as a negative electrode active material aluminum, silicon, or the like electrochemically alloyed with lithium during charge has been proposed in recent years (cf. Japanese Unexamined Patent Publication No. 10-255768). The lithium secondary battery using such an alloy negative electrode, however, has the following problems. Since the negative electrode active material expands and shrinks greatly as a charge-discharge process is repeated, the active material tends to pulverize or peel off from the current collector during charge and discharge. Moreover, wrinkles occur in the current collector during charge and discharge, which degrade the battery's charge-discharge efficiency and cycle performance.

In order to solve the above-noted problems, the present applicant has already proposed a lithium secondary battery that comprises a negative electrode current collector surface formed to have irregularities and an amorphous silicon thin film deposited, as an negative electrode active material layer, on the irregular surface, wherein the surface roughness Ra is restricted to fall within a predetermined range or the tensile strength of the negative electrode current collector is greater than a predetermined value (see Japanese Unexamined Patent Publication Nos. 2002-83594 and 2003-7305).

Nevertheless, even the lithium secondary batteries according to the above-noted publications are in some cases unable to sufficiently prevent the wrinkles in the negative electrode current collector, causing initial charge-discharge characteristics and cycle performance to degrade.

BRIEF SUMMARY OF THE INVENTION

The present invention has been accomplished in view of the foregoing and other problems. Accordingly, it is an object of the present invention to provide a lithium secondary battery that prevents wrinkles in the negative electrode current collector from occurring when using an alloy negative electrode and has good initial charge-discharge characteristics and good cycle performance.

The known factors that relate to the wrinkles in the negative electrode current collector are: depth of charge-discharge, thickness of active material layer, and strength of negative electrode current collector (tensile strength of negative electrode current collector×negative electrode current collector base thickness). The present inventors have conducted intensive research for preventing the wrinkles in the negative electrode current collector and, as a result, have found an optimum relationship between thickness of negative electrode active material and strength of negative electrode current collector for preventing the wrinkles, among the above-noted three factors related to the formation of the wrinkles. The details of the present invention will be described in the following.

Accordingly, the present invention provides a lithium secondary battery comprising a negative electrode, a positive electrode, and a non-aqueous electrolyte, the negative electrode containing a negative electrode current collector having an irregular surface and an negative electrode active material layer formed on the irregular surface, wherein the negative electrode active material layer is composed of a material that alloys with Li, the thickness of the negative electrode active material layer ($\mu m$)/10-point mean roughness Rz of the negative electrode current collector surface ($\mu m$) is in the range of from 0.5 to 4, and the tensile strength of the negative electrode current collector at 25° C. (N/mm$^2$)×negative electrode current collector base thickness (mm)/thickness of the negative electrode active material layer ($\mu m$) is 2 or greater.

DETAILED DESCRIPTION OF THE PREFERRED EMBODIMENTS

Figure 1:
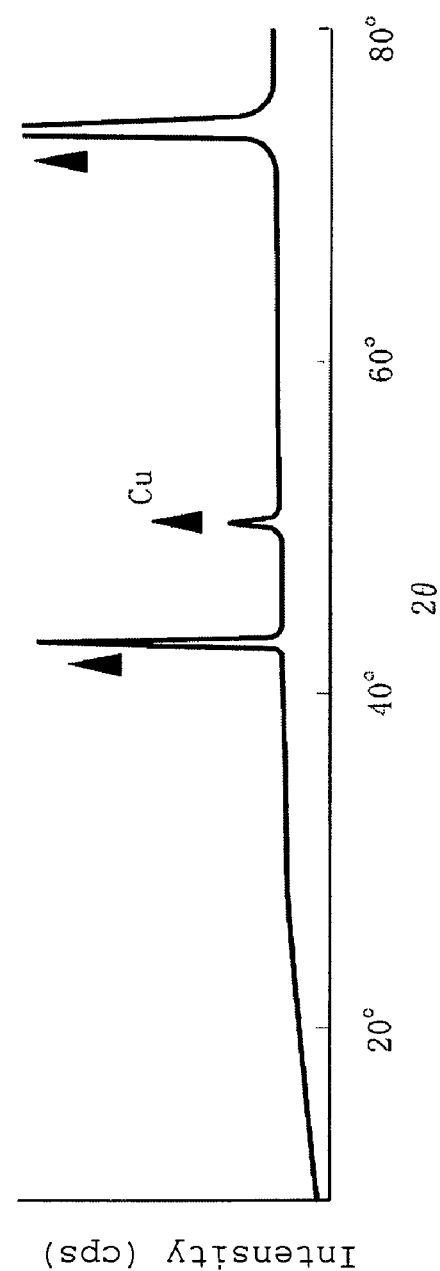
FIG. 1 is an X-ray chart of a negative electrode surface.

The value of thickness of the negative electrode active material layer ($\mu m$)/10-point mean roughness Rz of the negative electrode current collector surface ($\mu m$) is restricted within the above-stated range for the following reason. If the thickness of the negative electrode active material layer ($\mu m$)/Rz ($\mu m$) is greater than 4, the active material on the negative electrode surface pulverizes or the active material peels off from the negative electrode current collector, causing cycle performance to degrade. On the other hand, if the thickness of the negative electrode active material layer ($\mu m$)/Rz ($\mu m$) is less than 0.5, charge-discharge efficiency degrades.

Also, the value of tensile strength of the negative electrode current collector (N/mm$^2$)×negative electrode current collector base thickness (mm)/thickness of the negative electrode active material layer ($\mu m$) on one side of current collector is restricted for the following reason. As discussed above, thickness of the negative electrode active material layer is also a factor for causing the wrinkles in the negative electrode current collector; therefore, merely obtaining the optimal value for strength of the negative electrode current collector, i.e., tensile strength of the negative electrode current collector×negative electrode current collector base thickness, does not yield the optimal value for preventing the wrinkles. For this reason, strength of the negative electrode current collector is standardized using thickness of the negative electrode active material layer.

It should be noted that the term "negative electrode current collector base thickness" means the thickness of a negative electrode current collector that has not yet been subjected to a roughening treatment. Further, it is preferable that the irregularities formed on the negative electrode current collector be in a granular form.

In the lithium secondary battery of the invention, thickness of the negative electrode active material layer ($\mu m$)/negative electrode current collector base thickness ($\mu m$) is 2 or greater.

The value of thickness of the negative electrode active material layer/negative electrode current collector base thickness is restricted within the above-stated range for the following reason. That is, by increasing the negative electrode current collector base thickness, the strength of the negative electrode current collector increases. However, by doing so, the volume of the current collector occupying the battery internal volume accordingly increases, thereby decreasing the value of battery discharge capacity (mAh)/(negative electrode current collector base thickness (μm)+two-side thickness of negative electrode active material (μm)), which influences the battery's volume energy density. Thus, the battery's volume energy density undesirably reduces.

In the lithium secondary battery of the invention, the negative electrode current collector has a tensile strength of 800 (N/mm$^2$) or greater at 25° C.

When the tensile strength is 800 (N/mm$^2$) or greater as described above, the strength of the current collector is accordingly large, which is preferable from the viewpoint of preventing wrinkles in the negative electrode current collector.

It is believed that the upper limit of the tensile strength will be about 1600 (N/mm$^2$) when taking into consideration the materials, the thickness of the negative electrode active material layer, and the negative electrode current collector base thickness that will be actually employed.

In the lithium secondary battery of the invention, it is preferable that the negative electrode active material layer be divided into columnar structures by gaps that form along its thickness, and that bottom portions of the columnar structures be in close contact with the current collector.

When the negative electrode active material layer is divided into columnar structures by gaps that form along its thickness as described above, spaces form around the columnar structures. These spaces alleviate the stress that is caused by the expansion and shrinkage of the thin film associated with charge-discharge cycles, and prevent such a stress that can cause the negative electrode active material layer to peel off from the negative electrode current collector. As a result, it becomes possible to maintain good, close contact of the bottom portions of the columnar structures with the negative electrode current collector.

In the lithium secondary battery of the invention, the negative electrode active material layer may be an amorphous thin film.

In the lithium secondary battery of the invention, the negative electrode active material layer may also be a microcrystalline silicon thin film.

Furthermore, in the lithium secondary battery of the invention, the negative electrode active material layer may be an amorphous silicon thin film.

Herein, conventionally known materials may be used for battery components other than the negative electrode.

Examples of the positive electrode material include manganese dioxide, lithium-containing manganese oxide, lithium-containing cobalt oxide, lithium-containing vanadium oxide, lithium-containing nickel oxide, lithium-containing iron oxide, lithium-containing chromium oxide, and lithium-containing titanium oxide.

Examples of the solvent for the non-aqueous electrolyte include a mixed solvent in which a cyclic carbonic ester such as ethylene carbonate, propylene carbonate, butylene carbonate, or vinylene carbonate is mixed with a chain carbonic ester such as dimethyl carbonate, methyl ethyl carbonate, or diethyl carbonate; and a mixed solvent in which any of the above-listed cyclic carbonic esters is mixed with an ether such as 1,2-dimethoxyethane or 1,2-diethoxyethane.

Examples of the solute for the non-aqueous electrolyte include: LiXF$_p$ (wherein X is P, As, Sb, Al, B, Bi, Ga, or In; and p is 6 when X is P, As or Sb, or p is 4 when X is Al, B, Bi, Ga, or In), LiCF$_3$SO$_3$, LiN(C$_m$F$_{2m+1}$SO$_2$)(C$_n$F$_{2n+1}$SO$_2$) (wherein m and n are each an integer of from 1 to 4, independently of each other), LiC(C$_l$F$_{2l+1}$SO$_2$) (C$_m$F$_{2m+1}$SO$_2$) (C$_n$F$_{2n+1}$SO$_2$) (where l, m, and n are each an integer of from 1 to 4, independently of each other), and mixtures thereof.

It is also possible to use, as the non-aqueous electrolyte, a gelled polymer electrolyte in which a non-aqueous electrolyte solution is impregnated into a polymer such as polyethylene oxide and polyacrylonitrile.

It is preferable that the negative electrode current collector to be used have irregularities with an arithmetical mean roughness Ra of from 0.1 μm to 1.0 μm. More preferably, the arithmetical mean roughness Ra is in the range of from 0.2 μm to 0.5 μm. The 10-point mean roughness Rz is preferably 1.0 μm to 10.0 μm. If Ra and Rz are outside these ranges, the contact between the active material and the current collector will become poor and the discharge capacity will suffer. It should be noted that arithmetical mean roughness Ra and 10-point mean roughness Rz are measured according to Japanese Industrial Standard (JIS) B 0601-1994.

Examples of the material that may be used for the negative electrode current collector include copper, copper alloy, nickel, nickel alloy, stainless steel, iron, iron alloy, molybdenum, tantalum, and tungsten. Among them, it is preferable to use copper alloy or nickel alloy.

According to the present invention, tensile strength of the negative electrode current collector at 25° C. (N/mm$^2$)×negative electrode current collector base thickness (mm)/thickness of the negative electrode active material layer (μm) is 2 or greater. This means that the strength of the current collector is great and wrinkles due to charge and discharge do not easily occur in the negative electrode current collector. As a consequence, degradations in initial charge-discharge characteristics and cycle performance, which are due to the heterogeneous reaction originating from the wrinkles, can be prevented.

Moreover, the value of thickness of the negative electrode active material layer (μm)/10-point mean roughness Rz of the negative electrode current collector surface (μm) is restricted in the range of from 0.5 to 4. This means that the following excellent advantages are attained. It is possible to prevent pulverization of the negative electrode active material on the negative electrode surface and peeling-off of the negative electrode active material from the negative electrode current collector, and moreover, it is possible to prevent degradation in cycle performance originating from the pulverization of the negative electrode active material on the negative electrode surface and the peeling-off of the negative electrode active material from the negative electrode current collector.

Embodiments

Hereinbelow, a lithium secondary battery according to the present invention is described in further detail with reference to FIGS. 1 to 4. It should be understood, however, that the lithium secondary battery according to the present invention is not limited to the following examples but various changes and modifications are possible without departing from the scope of the invention as defined by the appended claims.

Preparation of Negative Electrode

A copper alloy foil having irregularities (tensile strength: 800 N/mm$^2$, negative electrode current collector base thickness: 20 μm, Ra=0.4 μm, Rz=4 μm) was prepared as a negative electrode current collector. The copper alloy foil was annealed under the following conditions. Thus, a negative electrode current collector (negative electrode current collector base thickness: 20 μm, Ra=0.4 μm, Rz=4 μm) that has a tensile strength of 400 N/mm² and is made of a copper alloy foil was prepared.

Annealing Conditions
Atmosphere: Ar atmosphere
Temperature: 500° C.
Annealing time: 10 hours A silicon thin film was formed on the irregular surface of the negative electrode current collector made of the annealed copper alloy foil by RF sputtering. The conditions of the sputtering were as follows.

Sputtering Conditions
Sputtering gas (Ar) flow rate: 100 sccm
Substrate temperature: room temperature (not heated)
Reaction pressure: $1.0 \times 10^{-3}$ Torr
High-frequency power: 200 W The silicon thin film was deposited until the thickness on one side reaches about 4 μm, and the film was formed on each of the surfaces of the current collector. In this way, an electrode having a size of 2 cm×2 cm was fabricated. The discharge capacity per unit area of one side was 2.75 mAH/cm². It should be noted that when the surface of the negative electrode thus fabricated was analyzed by X ray analysis, only the peak originating from copper was observed and broad peaks were observed, as shown in FIG. 1. Therefore, it is believed that the silicon thin film was in an amorphous form.

Preparation of Positive Electrode

A slurry was prepared by mixing 85 parts by weight of $LiCoO_2$ powder as a positive electrode active material, 10 parts by weight of carbon powder as a conductive agent, and 5 parts by weight of polyvinylidene fluoride powder as a binder agent dissolved in NMP (N-methyl-2-pyrrolidone). The resultant slurry was applied on one side of an aluminum foil having a thickness of 20 μm as a current collector by doctor blading to form an active material layer and thereafter dried at 150° C. Thus, a positive electrode having a size of 2 cm×2 cm was fabricated. This electrode had a discharge capacity of 2.60 mAh/cm².

Separator

A microporous polyethylene film was employed as a separator.

Preparation of Electrolyte Solution

An electrolyte solution was prepared by dissolving $LiPF_6$ at 1 mol/dm³ in a mixed solvent of a 1:1 volume ratio of ethylene carbonate and diethyl carbonate.

Preparation of Lithium Secondary Battery

Using the positive electrode, the negative electrode, the separator, and the non-aqueous electrolyte prepared in the above-described manner, a small-sized laminate lithium secondary battery was fabricated.

Figure 2:
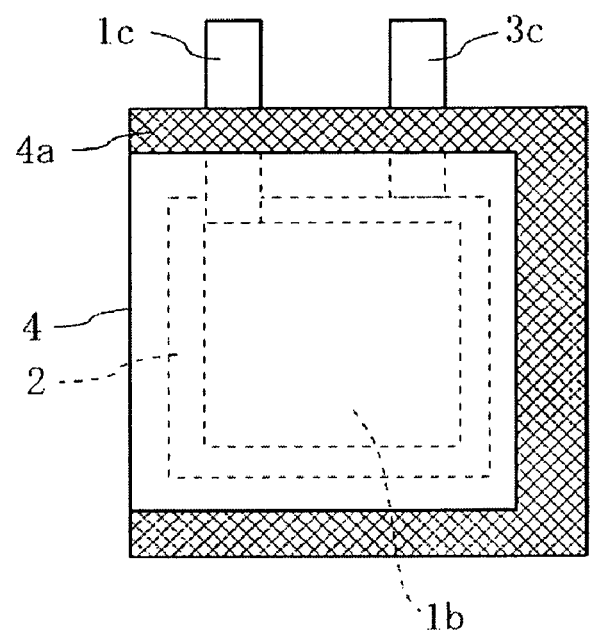
FIG. 2 is a view illustrating the outward appearance of a lithium secondary battery according to an embodiment of the invention.
Figure 3:
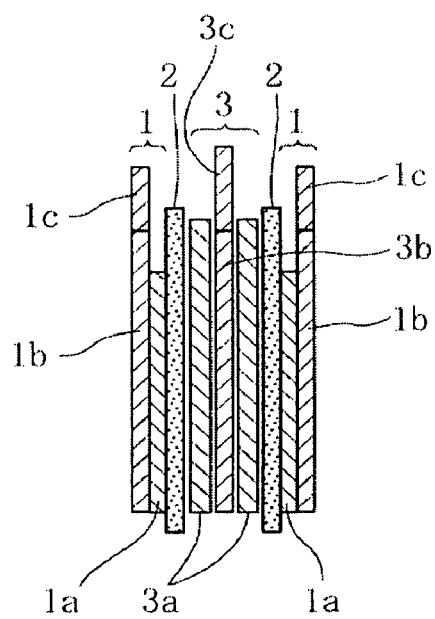
FIG. 3 is a cross-sectional view illustrating the inside of a lithium secondary battery according to an embodiment of the invention.
Figure 4:
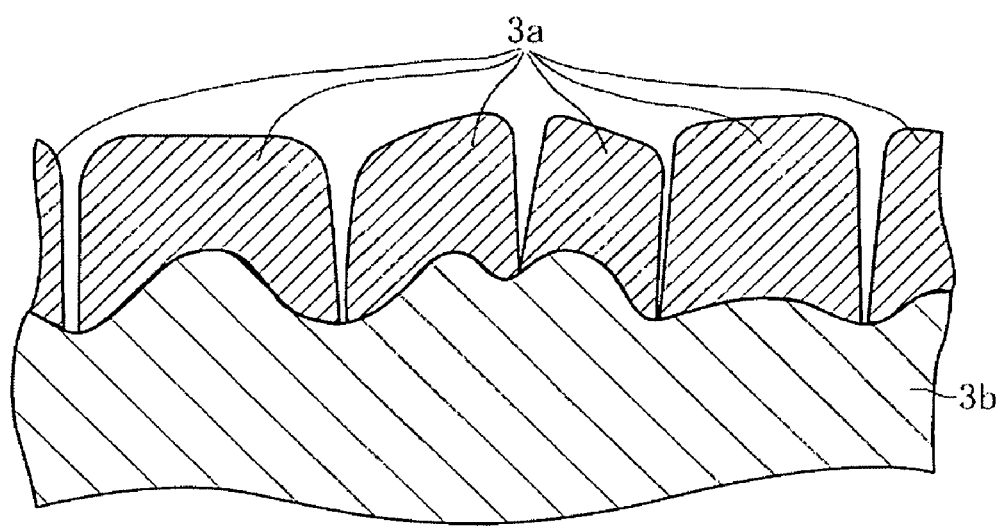
FIG. 4 is an enlarged view of the surface of the current collector in a lithium secondary battery according to an embodiment of the invention.

The lithium secondary battery has a specific configuration as shown in FIGS. 2 and 3, and comprises a positive electrode 1, a separator 2, a negative electrode 3, an outer case 4, and so forth. The positive electrode 1 and the negative electrode 3 are accommodated in the outer case 4, opposing each other with the separator 2 interposed therebetween. The peripheral edges of the outer case 4 are sealed by a sealing part 4a. The positive electrode 1 includes a positive electrode active material layer 1a formed on a positive electrode current collector 1b and a positive electrode tab 1c to which the positive electrode current collector 1b is attached, and the negative electrode 3 includes negative electrode active material layers 3a formed on a negative electrode current collector 3b and a negative electrode tab 3c to which the negative electrode current collector 3b is attached. In this way, the respective electrodes are configured so that the chemical energy produced inside the battery can be taken out as electric energy. It should be noted that, as illustrated in FIG. 4, the negative electrode active material layer 3a is divided by gaps that form along its thickness to form columnar structures and the bottom portions of the columnar structures are in close contact with the current collector 3b.

Other Variations

Although a laminate-type lithium secondary battery is described as an illustrative example in the above-described embodiment, the battery configuration is not particularly limited and the present invention is applicable to various lithium secondary batteries with various shapes, such as coin-type ones.

EXAMPLES

Examples of the present invention are described below.

Example 1

A battery fabricated in the same manner as described in the foregoing embodiment was used as a test cell for Example 1.
The battery thus fabricated is hereinafter referred to as Battery A1 of the present invention.

Example 2

A battery was fabricated in the same manner as in Example 1, except that a positive electrode having a discharge capacity per unit area of 2.0 mAh/cm² was used as the positive electrode.
The battery thus fabricated is hereinafter referred to as Battery A2 of the invention.

Example 3

A battery was fabricated in the same manner as in Example 1, except that the copper alloy foil was annealed at 350° C. so that the tensile strength of the negative electrode current collector was 550 N/mm², and a positive electrode having a discharge capacity per unit area of 2.0 mAh/cm² was used as the positive electrode.
The battery thus fabricated is hereinafter referred to as Battery A3 of the invention.

Example 4

A battery was fabricated in the same manner as in Example 1, except that the copper alloy foil was not annealed so that the tensile strength of the negative electrode current collector was 800 N/mm², and a positive electrode having a discharge capacity per unit area of 2.0 mAh/cm² was used as the positive electrode.
The battery thus fabricated is hereinafter referred to as Battery A4 of the invention.

Example 5

A battery was fabricated in the same manner as in Example 1, except that the copper alloy foil was not annealed so that the tensile strength of the negative electrode current collector was 800 N/mm², a positive electrode having a discharge capacity per unit area of 3.0 mAh/cm² was used as the positive electrode, and the thickness of the negative electrode active material layer was 6 μm.

The battery thus fabricated is hereinafter referred to as Battery A5 of the invention.

Example 6

A battery was fabricated in the same manner as in Example 1, except that the copper alloy foil was not annealed so that the tensile strength of the negative electrode current collector was 800 N/mm², that a positive electrode having a discharge capacity per unit area of 4.0 mAh/cm² was used as the positive electrode, and that the thickness of the negative electrode active material layer was 8 μm.

The battery thus fabricated is hereinafter referred to as Battery A6 of the invention.

Example 7

A battery was fabricated in the same manner as in Example 1, except that the negative electrode current collector base thickness was 25 μm and a positive electrode having a discharge capacity per unit area of 2.0 mAh/cm² was used as the positive electrode.

The battery thus fabricated is hereinafter referred to as Battery A7 of the invention.

Examples 8-10

Three batteries were fabricated in the same manner as in Example 1, except that the surface roughnesses Rz were set at 1 μm, 4 μm, and 8 μm, respectively.

The batteries thus fabricated are hereinafter referred to as Batteries A8, A9, and A10 of the invention, respectively.

Comparative Example 1

A battery was fabricated in the same manner as in Example 1, except that the negative electrode current collector base thickness was 15 μm and a positive electrode having a discharge capacity per unit area of 2.0 mAh/cm² was used as the positive electrode.

The battery thus fabricated is hereinafter referred to as Comparative Battery X1.

Comparative Example 2

A battery was fabricated in the same manner as in Example 1, except that the thickness of the negative electrode active material layer was 6 μm and a positive electrode having a discharge capacity per unit area of 3.0 mAh/cm² was used as the positive electrode.

The battery thus fabricated is hereinafter referred to as Comparative Battery X2.

Comparative Examples 3 and 4

Two batteries were fabricated in the same manner as in Example 1, except that the surface roughnesses Rz were set at 0.8 μm and 10 μm, respectively.

The batteries thus fabricated are hereinafter referred to as Comparative Batteries X3 and X4, respectively.

Comparative Example 5

A battery was fabricated in the same manner as in Example 1, except that the surface of the negative electrode current collector was not subjected to a roughening treatment.

The battery thus fabricated is hereinafter referred to as Comparative Battery X5.

Experiment

The above-described Batteries A1 to A10 of the invention and Comparative Batteries X1 to X5 were tested for 50 cycles, in which charge and discharge were repeated according to the following charge-discharge conditions, to examine their charge-discharge efficiencies and capacity retention ratios. The results are shown in Table 1.

The charge-discharge efficiency and capacity retention ratio are defined by the equations below.

Charge-Discharge Conditions

Charge the batteries to 4.2 V with constant current at the current values as set forth in Table 2.

After constant-voltage charging the batteries to 1/20 of the current values set forth in Table 2, discharge the batteries to 2.75 V with the current values set forth in Table 2.

Equations for Calculating Charge-Discharge Efficiency and Capacity Retention Ratio Charge-discharge efficiency (%)=(Discharge capacity at 1st cycle/Charge capacity at 1st cycle)×100

Capacity retention ratio (%)=(Discharge capacity at 50th cycle/Discharge capacity at 1st cycle)×100

TABLE 1

| Battery | Positive electrode discharge capacity (mAh/cm²) | Surface roughness Rz (μm) | Thickness of negative electrode active material layer (μm) | A | Tensile strength (N/mm²) | Negative electrode current collector base thickness (μm) | B | C | D | Charge-discharge efficiency (%) | Capacity retention ratio (%) |
|---|---|---|---|---|---|---|---|---|---|---|---|
| A1  | 2.60 | 4 | 4 | 1   | 400 | 20 | 0.20 | 2.0 | 0.64 | 93.0 | 94.0 |
| A2  | 2.0  | 4 | 4 | 1   | 400 | 20 | 0.20 | 2.0 | 0.50 | 91.0 | 93.5 |
| A3  | 2.0  | 4 | 4 | 1   | 550 | 20 | 0.20 | 2.8 | 0.50 | 91.5 | 93.2 |
| A4  | 2.0  | 4 | 4 | 1   | 800 | 20 | 0.20 | 4.0 | 0.50 | 92.5 | 93.0 |
| A5  | 3.0  | 4 | 6 | 1.5 | 800 | 20 | 0.30 | 2.7 | 0.66 | 92.3 | 92.5 |
| A6  | 4.0  | 4 | 8 | 2.0 | 800 | 20 | 0.40 | 2.0 | 0.78 | 92.0 | 92.0 |
| A7  | 2.0  | 4 | 4 | 1   | 400 | 25 | 0.16 | 2.5 | 0.42 | 92.2 | 93.3 |
| A8  | 2.60 | 1 | 4 | 4   | 400 | 20 | 0.20 | 2.0 | 0.64 | 92.5 | 92.0 |
| A9  | 2.60 | 4 | 4 | 1   | 400 | 20 | 0.20 | 2.0 | 0.64 | 93.0 | 94.0 |
| A10 | 2.60 | 8 | 4 | 0.5 | 400 | 20 | 0.20 | 2.0 | 0.64 | 92.0 | 93.6 |
| X1  | 2.0  | 4 | 4 | 1   | 400 | 15 | 0.27 | 1.5 | 0.61 | 88.0 | 88.5 |

TABLE 1-continued

| Battery | Positive electrode discharge capacity (mAh/cm²) | Surface roughness Rz (μm) | Thickness of negative electrode active material layer (μm) | A | Tensile strength (N/mm²) | Negative electrode current collector base thickness (μm) | B | C | D | Charge-discharge efficiency (%) | Capacity retention ratio (%) |
|---|---|---|---|---|---|---|---|---|---|---|---|
| X2 | 3.0 | 4 | 6 | 1.5 | 400 | 20 | 0.30 | 1.3 | 0.66 | 86.0 | 87.0 |
| X3 | 2.60 | 0.8 | 4 | 5 | 400 | 20 | 0.20 | 2.0 | 0.64 | 89.5 | 86.0 |
| X4 | 2.60 | 10 | 4 | 0.4 | 400 | 20 | 0.20 | 2.0 | 0.64 | 86.0 | 90.8 |
| X5 | 2.60 | — | 4 | — | 400 | 20 | 0.20 | 2.0 | 0.03 | 46.6 | 1.1 |

In Table 1,
A = Thickness of negative electrode active material layer (μm)/Rz (μm)
B = Thickness of negative electrode active material layer (μm)/Negative electrode current collector base thickness (μm)
C = Tensile strength (N/mm²) × Negative electrode current collector base thickness (mm)/Thickness of negative electrode active material layer (μm)
D = Discharge capacity of battery (mAh)/(Negative electrode current collector base thickness (μm) + Two-side thickness of negative electrode active material (μm))

TABLE 2

| | Current during charge/discharge (mA) |
|---|---|
| Battery A1 | 18 |
| Battery A2 | 14 |
| Battery A3 | 14 |
| Battery A4 | 14 |
| Battery A5 | 21 |
| Battery A6 | 28 |
| Battery A7 | 14 |
| Battery A8 | 18 |
| Battery A9 | 18 |
| Battery A10 | 18 |
| Comparative Battery X1 | 14 |
| Comparative Battery X2 | 21 |
| Comparative Battery X3 | 18 |
| Comparative Battery X4 | 18 |
| Comparative Battery X5 | 18 |

As clearly seen from Table 1, in Batteries A1 to A10 of the invention, thickness of the negative electrode active material layer (μm)/10-point mean roughness Rz of the negative electrode current collector surface (μm), i.e., A, was 0.5 to 4, and tensile strength of the negative electrode current collector at 25° C. (N/mm²)×negative electrode current collector base thickness (mm)/thickness of the negative electrode active material layer (μm) on one side of current collector, i.e., C, was 2 or greater. It will be readily appreciated that Batteries A1 to A10 of the invention showed superior initial charge-discharge efficiency and superior cycle performance as compared to Comparative Batteries X1 to X5, which had values out of the above-described ranges.

It is believed that these results are attributable to the following reasons. That is, when thickness of the negative electrode active material layer (μm)/Rz (μm) is greater than 4 (which corresponds to Comparative Battery X3), the active material pulverizes on the negative electrode surface or peels off from the negative electrode current collector and, consequently, the cycle performance degrades. When the thickness of the negative electrode active material layer (μm)/Rz (μm) is less than 0.5 (which corresponds to Comparative Battery X4), cracks in the negative electrode active material layer (which correspond to the gaps that form along the thickness of the negative electrode active material layer) tend to form unevenly and therefore the charge-discharge efficiency degrades.

Also, when tensile strength (N/mm²)×negative electrode current collector base thickness (mm)/thickness of the negative electrode active material layer (μm) on one side of current collector is less than 2 (which corresponds to Comparative Batteries X1 and X2), wrinkles occur in the negative electrode current collector, and charge-discharge efficiency and cycle performance degrade due to the heterogeneous reaction originating from the wrinkles.

In contrast, Batteries A1 to A10 of the invention have optimal values both for thickness of the negative electrode active material layer (μm)/Rz (μm) and for tensile strength (N/mm²)×negative electrode current collector base thickness (mm)/thickness of the negative electrode active material layer (μm) on one side of current collector. For this reason, the active material did not pulverize on the negative electrode surface or peel off from the negative electrode current collector, and furthermore, the formation of wrinkles was prevented in the negative electrode current collector; therefore, degradations in initial charge-discharge efficiency and cycle performance were prevented.

It will be appreciated that Comparative Battery X5, which used a current collector having a surface which was not roughened, was very poor in charge-discharge efficiency and cycle performance. It is believed that this was because the active material fell off from the negative electrode current collector. Accordingly, it will be readily understood that, in order to prevent degradation in charge-discharge efficiency and cycle performance, providing the negative electrode current collector surface with irregularities is the minimal requirement.

Moreover, it will be apparent from Table 1 that, with Batteries A2 to A4 of the invention, as the tensile strengths of the current collectors increased, the initial charge-discharge efficiencies accordingly increased. It is believed that this means the formation of the wrinkles was prevented according to the increase of the tensile strength of the negative electrode current collector.

As clearly seen from Table 1, Battery A7 of the invention, in which thickness of negative electrode active material layer (μm)/negative electrode current collector base thickness (μm) was less than 0.2, showed a smaller value of capacity (mAh)/(negative electrode current collector base thickness (μm)+ thickness of two-side negative electrode active material (μm)) than Batteries A1 to A6 and A8 to A10 of the invention, in which the values were 0.2 or greater. This is believed to be due to the following reason. When current collector base thickness is greater, the volume of the current collector that occupies the battery internal volume accordingly becomes greater. Therefore, the value of discharge capacity of battery capacity (mAh)/(negative electrode current collector base thickness (μm)+negative electrode active material two-side thickness (μm)), which affects the battery's volume energy density, becomes smaller. As a result, Battery A7 of the invention showed a reduced volume energy density. Therefore, it is preferable that thickness of negative electrode active material/negative electrode current collector base thickness be 0.2 or greater.

From the results as described above, it will be understood that good initial charge-discharge characteristics and good cycle performance are attained when thickness of the negative electrode active material layer (μm)/10-point mean roughness Rz of the negative electrode current collector surface (μm) is in the range of from 0.5 to 4, and tensile strength of the negative electrode current collector at 25° C. (N/mm$^2$)×negative electrode current collector base thickness (mm)/thickness of the negative electrode active material layer (μm) is 2 or greater.

In addition, it will be understood that thickness of the negative electrode active material/negative electrode current collector base thickness should preferably be 0.2 or greater.

The present invention can be suitably applied to lithium secondary batteries using alloy negative electrodes.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

This application claims priority based on Japanese application No. 2004-100359 filed Mar. 30, 2004, which is incorporated herein by reference.

What is claimed is:

1. A lithium secondary battery comprising: a negative electrode, a positive electrode, and a non-aqueous electrolyte, the negative electrode including a negative electrode current collector having an irregular surface and a negative electrode active material layer formed on the irregular surface, wherein:
the negative electrode active material layer is composed of a material that alloys with Li,
thickness of the negative electrode active material layer (μm)/10-point mean roughness Rz of the negative electrode current collector surface (μm) is in the range of from 0.5 to 4, and
tensile strength of the negative electrode current collector at 25° C. (N/mm$^2$)×negative electrode current collector base thickness (mm)/thickness of the negative electrode active material layer (μm) on one side of current collector is 2 or greater.

2. The lithium secondary battery according to claim 1, wherein thickness of the negative electrode active material layer (μm)/negative electrode current collector base thickness (μm) is 0.2 or greater.

3. The lithium secondary battery according to claim 1, wherein the negative electrode current collector has a tensile strength of 800 (N/mm$^2$) or greater at 25° C.

4. The lithium secondary battery according to claim 2, wherein the negative electrode current collector has a tensile strength of 800 (N/mm$^2$) or greater at 25° C.

5. The lithium secondary battery according to claim 1, wherein the negative electrode active material layer is divided by gaps that form along its thickness to form columnar structures, and bottom portions of the columnar structures are in close contact with the negative electrode current collector.

6. The lithium secondary battery according to claim 2, wherein the negative electrode active material layer is divided by gaps that form along its thickness to form columnar structures, and bottom portions of the columnar structures are in close contact with the negative electrode current collector.

7. The lithium secondary battery according to claim 3, wherein the negative electrode active material layer is divided by gaps that form along its thickness to form columnar structures, and bottom portions of the columnar structures are in close contact with the negative electrode current collector.

8. The lithium secondary battery according to claim 4, wherein the negative electrode active material layer is divided by gaps that form along its thickness to form columnar structures, and bottom portions of the columnar structures are in close contact with the negative electrode current collector.

9. The lithium secondary battery according to claim 5, wherein the negative electrode active material layer is an amorphous thin film.

10. The lithium secondary battery according to claim 6, wherein the negative electrode active material layer is an amorphous thin film.

11. The lithium secondary battery according to claim 7, wherein the negative electrode active material layer is an amorphous thin film.

12. The lithium secondary battery according to claim 8, wherein the negative electrode active material layer is an amorphous thin film.

13. The lithium secondary battery according to claim 5, wherein the negative electrode active material layer is a microcrystalline silicon thin film.

14. The lithium secondary battery according to claim 6, wherein the negative electrode active material layer is a microcrystalline silicon thin film.

15. The lithium secondary battery according to claim 7, wherein the negative electrode active material layer is a microcrystalline silicon thin film.

16. The lithium secondary battery according to claim 8, wherein the negative electrode active material layer is a microcrystalline silicon thin film.

17. The lithium secondary battery according to claim 9, wherein the negative electrode active material layer is an amorphous silicon thin film.

18. The lithium secondary battery according to claim 10, wherein the negative electrode active material layer is an amorphous silicon thin film.

19. The lithium secondary battery according to claim 11, wherein the negative electrode active material layer is an amorphous silicon thin film.

20. The lithium secondary battery according to claim 12, wherein the negative electrode active material layer is an amorphous silicon thin film.

* * * * *